US010815134B2

United States Patent
Sasabe et al.

(10) Patent No.: US 10,815,134 B2
(45) Date of Patent: Oct. 27, 2020

(54) WATER TREATMENT DEVICE

(71) Applicant: Panasonic Intellectual Property Management Co., Ltd., Osaka-shi, Osaka (JP)

(72) Inventors: Shigeru Sasabe, Shiga (JP); Tomoko Tani, Osaka (JP); Noriyoshi Ueya, Osaka (JP); Kazuo Imai, Shiga (JP); Hiroaki Kitagawa, Shiga (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 145 days.

(21) Appl. No.: 16/087,469

(22) PCT Filed: Apr. 24, 2017

(86) PCT No.: PCT/JP2017/016131
§ 371 (c)(1),
(2) Date: Sep. 21, 2018

(87) PCT Pub. No.: WO2018/008235
PCT Pub. Date: Jan. 11, 2018

(65) Prior Publication Data
US 2019/0112204 A1    Apr. 18, 2019

(30) Foreign Application Priority Data

Jul. 7, 2016  (JP) ................ 2016-134779
Jan. 25, 2017  (JP) ................ 2017-010907

(51) Int. Cl.
*C02F 1/46*  (2006.01)
*C02F 1/461*  (2006.01)
(Continued)

(52) U.S. Cl.
CPC .......... *C02F 1/4602* (2013.01); *B01D 61/445* (2013.01); *B01D 61/46* (2013.01);
(Continued)

(58) Field of Classification Search
None
See application file for complete search history.

(56) References Cited

U.S. PATENT DOCUMENTS 5,788,826 A    8/1998  Nyberg
9,701,547 B2 *  7/2017  Uno ........................ B01J 47/12
(Continued)

FOREIGN PATENT DOCUMENTS

JP    2001-509074    7/2001
JP    2003-164751    6/2003
(Continued)

*Primary Examiner* — Salil Jain
(74) *Attorney, Agent, or Firm* — Hamre, Schumann, Mueller & Larson, P.C.

(57) ABSTRACT

The water treatment device according to the present disclosure includes: an electrochemical cell having electrodes including a positive electrode and a negative electrode, and a bipolar membrane; a tank; a power supply configured to apply power to the electrodes; a water circulation flow path having at least the tank and the electrochemical cell and through which water circulates; a circulation device configured to circulate water in the water circulation flow path; a raw water supply path configured to supply raw water to the water circulation flow path; and a control device. In performing water softening treatment in the electrochemical cell where power is applied to the electrodes so as to remove ions from raw water and soft water is produced, the control device drives the circulation device so as to circulate water in the water circulation flow path.

12 Claims, 6 Drawing Sheets (51) Int. Cl.
  *B01D 61/46* (2006.01)
  *B01D 65/02* (2006.01)
  *B01D 61/50* (2006.01)
  *B01D 61/44* (2006.01)
  *B01D 61/54* (2006.01)
  *C02F 5/10* (2006.01)
  *C02F 1/469* (2006.01)

(52) U.S. Cl.
  CPC ............. *B01D 61/50* (2013.01); *B01D 61/54* (2013.01); *B01D 65/02* (2013.01); *C02F 5/10* (2013.01); *B01D 2311/22* (2013.01); *B01D 2311/24* (2013.01); *B01D 2311/2649* (2013.01); *B01D 2313/14* (2013.01); *B01D 2313/48* (2013.01); *B01D 2321/16* (2013.01); *B01D 2321/223* (2013.01); *C02F 1/469* (2013.01); *C02F 1/46109* (2013.01); *C02F 2001/46152* (2013.01); *C02F 2201/005* (2013.01); *C02F 2201/4611* (2013.01); *C02F 2201/4616* (2013.01); *C02F 2201/4618* (2013.01); *C02F 2201/46115* (2013.01); *C02F 2201/46145* (2013.01)

(56) References Cited

U.S. PATENT DOCUMENTS

| | | | |
|---|---|---|---|
| 2014/0319065 A1* | 10/2014 | Taylor | C02F 5/10 210/701 |
| 2015/0225258 A1* | 8/2015 | Uno | B01J 49/75 210/290 |

FOREIGN PATENT DOCUMENTS

| | | | | |
|---|---|---|---|---|
| JP | 2006-043549 | | 2/2006 | |
| JP | 2010-091122 | | 4/2010 | |
| JP | 2012-081373 | * | 4/2012 | |
| JP | 2012-101172 | * | 5/2012 | |
| JP | 2014-133228 | | 7/2014 | |
| JP | 2014133228 A | * | 7/2014 | ............ B01J 41/05 |

* cited by examiner

WATER TREATMENT DEVICE

TECHNICAL FIELD

The present disclosure relates to a water treatment device having a water softening function.

BACKGROUND ART

Conventionally, as this type of water treatment device, there has been disclosed the configuration where water is made to flow into a housing, the water is softened as the water passes one flow path around an electrochemical cell disposed in the inside of the housing, and the water flows out to the outside of the housing as it is (see PTL 1, for example).

CITATION LIST

Patent Literature

PTL 1: JP-T-2001-509074

SUMMARY OF THE INVENTION

However, there is still a room for improvement in the above-mentioned conventional configuration from a viewpoint of efficiency in producing soft water.

The present disclosure has been made so as to overcome the above-mentioned drawback, and it is an object of the present disclosure to provide a water treatment device having a function of efficiently softening water.

To overcome the above-mentioned conventional drawback, a water treatment device of the present disclosure includes: an electrochemical cell having electrodes including a positive electrode and a negative electrode, and a bipolar membrane; a tank; a power supply configured to apply power to the electrodes; a water circulation flow path having at least the tank and the electrochemical cell and through which water circulates; a circulation device configured to circulate water in the water circulation flow path; a raw water supply path configured to supply raw water to the water circulation flow path; and a control device. In performing water softening treatment in the electrochemical cell where power is applied to the electrodes so as to remove ions from the raw water and soft water is produced, the control device drives the circulation device so as to circulate the water in the water circulation flow path.

Accordingly, raw water circulates in the water circulation flow path having the electrochemical cell so that the number of timings that hardness components (cations) such as calcium components and anions such as chloride ions in raw water are absorbed and removed by the electrochemical cell can be increased. As a result, it is possible to provide the water treatment device which can efficiently soften raw water.

According to the present disclosure, it is possible to provide the water treatment device having a function of efficiently softening water.

DESCRIPTION OF EMBODIMENT

A water treatment device according to a first disclosure includes: an electrochemical cell having electrodes including a positive electrode and a negative electrode, and a bipolar membrane; a tank; a power supply configured to apply power to the electrodes; a water circulation flow path having at least the tank and the electrochemical cell and through which water circulates; a circulation device configured to circulate water in the water circulation flow path; a raw water supply path configured to supply raw water to the water circulation flow path; and a control device. In performing water softening treatment in the electrochemical cell where power is applied to the electrodes so as to remove ions from the raw water and soft water is produced, the control device drives the circulation device so as to circulate the water in the water circulation flow path.

With such an operation, raw water circulates through the water circulation flow path having the electrochemical cell and hence, an amount of raw water which passes through the electrochemical cell can be increased by adjusting a circulation flow rate of raw water. Accordingly, the adsorption and the removal of hardness components (cations) such as calcium components and anions such as chloride ions in raw water can be increased. As a result, it is possible to provide the water treatment device which can efficiently soften raw water.

The second disclosure is directed to, particularly in the first disclosure, the water treatment device further including: a flow path switching device disposed in a middle portion of the water circulation flow path; and a soft water discharge path which is connected to the flow path switching device and through which soft water is discharged from the inside of the flow path switching device, wherein the flow path switching device is configured to select either an operation of making the tank and the soft water discharge path communicate with each other or an operation of forming the water circulation flow path into a closed flow path, and the flow path switching device is also configured to discharge the soft water stored in the tank through the soft water discharge path when the tank and the soft water discharge path are made to communicate with each other.

With such a configuration, soft water which is efficiently produced by softening can be stored in the tank and, it is also possible to form the flow path through which soft water stored in the tank can be discharged to the outside of the device by way of the soft water discharge path by merely switching the flow path switching device. Accordingly, it is possible to provide the water treatment device which can supply soft water to a user of the water treatment device at a low cost without forming a cumbersome flow path.

The third disclosure is directed to, particularly in the first disclosure, the water treatment device further including: a water drain path through which the water in the tank is drained; and a scale suppressing agent supply path through which a scale suppressing agent is supplied into the tank, wherein, in the electrochemical cell, in performing regeneration treatment of the bipolar membrane in which power is applied to the electrodes such that the electrodes have potentials reverse to potentials used in the water softening treatment, the control device allows the supply of regeneration-use water and a scale suppressing agent into the tank and, at the same time, drives the circulation device so as to circulate the water in the water circulation flow path, and drains the water used for the regeneration treatment stored in the tank through the water drain path.

With such a configuration, by circulating regeneration-use water through the water circulation flow path having the electrochemical cell, hardness components (cations) such as calcium components and anions such as chloride ions can be eliminated from the electrochemical cell with a small amount of regeneration-use water. As a result, the electrochemical cell can be efficiently regenerated. Further, it is possible to provide the water treatment device which can suppress the generation of a scale by the scale suppressing agent even when calcium is contained at high concentration.

The fourth disclosure is directed to, particularly in the first or third disclosure, the water treatment device further including: a filter disposed in the inside of the tank; an inlet port of the water circulation flow path to the tank; and an outlet port of the water circulation flow path from the tank, wherein the inlet port of the water circulation flow path to the tank is disposed on one side of the tank using the filter as a boundary, and the outlet port of the water circulation flow path to the tank is disposed on another side of the tank using the filter as the boundary.

With such a configuration, it is possible to provide the water treatment device which can enhance durability of the circulation device by collecting impurities contained in water flowing through the water circulation flow path. Further, it is possible to prevent mixing of impurities into produced soft water.

The fifth disclosure is directed to, particularly in the first or third disclosure, the water treatment device where the control device determines finishing of treatment based on a lapsed time from starting of the treatment or values of voltages applied to the electrodes in at least one of water softening treatment and regeneration treatment.

With such a configuration, it is possible to provide the water treatment device where finishing of the water softening treatment and regeneration treatment can be surely determined. In determining finishing of the treatment based on values of voltages applied to the electrodes, the determination is made by making use of physical properties of soft water and regenerated water. Accordingly, this configuration is particularly effective in determining finishing of the treatment.

The sixth disclosure is directed to, particularly in the first or third disclosure, the water treatment device where the positive electrode and the negative electrode are disposed such that the positive electrode and the negative electrode face the bipolar membrane so as to sandwich the bipolar membrane between the positive electrode and the negative electrode, and the positive electrode and the negative electrode are disposed at positions where the positive electrode and the negative electrode fall within a projection area of the bipolar membrane.

With such a configuration, although ions flow between the positive electrode, the bipolar membrane, and the negative electrode also in water softening treatment and regeneration treatment, the positive electrode and the negative electrode are disposed at the positions where the positive electrode and the negative electrode fall within the projection area of the bipolar membrane and hence, it is possible to allow ions which flow between the positive electrode and the negative electrode to flow through the bipolar membrane with certainty. Accordingly, it is possible to provide the water treatment device which can efficiently perform softening of raw water and regeneration of the bipolar membrane.

The seventh disclosure is directed to, particularly in the first or third disclosure, the water treatment device where the positive electrode and the negative electrode are formed in a planar shape, and opening portion is disposed at center portions of the respective electrodes.

With such a configuration, the concentration of a current on an end portion side can be alleviated and hence, electrode wear of an end portion and precipitation of a scale can be suppressed.

The eighth disclosure is directed to, particularly in the third disclosure, the water treatment device where a flow straightening members are disposed in the water circulation flow path upstream of and downstream of the bipolar membrane respectively so as to sandwich the bipolar membrane by the flow straightening members, each of the flow straightening members being made of an insulating material and having a plurality of flow path apertures formed by a latticed member.

It is possible to prevent clogging of the bipolar membrane caused by precipitates of hard components such as calcium components formed at the time of regenerating the bipolar membrane, and the precipitates can be collected by a filter disposed in the inside of the tank. With such a configuration, it is possible to provide the water treatment device which can regenerate the bipolar membrane in a stable manner.

The ninth disclosure is directed to, particularly in the third disclosure, the water treatment device where power to be applied to the electrodes is intermittently supplied when regeneration treatment of the bipolar membrane is performed. With such a configuration, it is possible to provide the water treatment device which can suppress the increase of temperatures of the electrodes.

The tenth disclosure is directed to, particularly in the first or third disclosure, the water treatment device further including: a water drain path configured to drain water in the tank; a filter disposed in the inside of the tank; an inlet port of the water circulation flow path to the tank; and an outlet port of the water circulation flow path from the tank, wherein the raw water supply path and the water drain path are vertically disposed upstream of and downstream of the tank, respectively, using the filter as a boundary, and the water which circulates the water circulation flow path flows into the tank from the inlet port, passes the filter from an arrangement direction of the water drain path toward an arrangement direction of the raw water supply path and, thereafter, flows out from the outlet port to the outside of the tank.

With such a configuration, although a scale ($CaCO_3$) is collected by a surface of the filter on a side where the water drain path is disposed, when raw water is supplied through the raw water supply path or when water in the tank is lowered at the time of draining water, the scale ($CaCO_3$) moves toward a water drain path side which is disposed vertically downstream of the filter used as a boundary. Accordingly, precipitates such as calcium components can be smoothly discharged from the water drain path.

The eleventh disclosure is directed to, particularly in the first disclosure, the water treatment device where an anion exchange group is disposed between at least one of the electrodes and the bipolar membrane and in at least one of flow paths of the water between the bipolar membranes.

With such a configuration, when an anion exchange group is disposed between the negative electrode during regeneration treatment and the bipolar membrane, it is possible to prevent calcium ions eliminated from a cation exchange group of the bipolar membrane from moving toward the negative electrode having a large amount of hydroxide ions, thus suppressing precipitation of a scale (CaCO3) in the vicinity of the negative electrode. Further, when an anion exchange group is disposed between the negative electrode during production of soft water (positive electrode during regeneration) and the bipolar membrane, it is possible to prevent calcium ions which exceeds an adsorption ability of the bipolar membrane and are eliminated from the cation exchange group of the bipolar membrane from moving toward the negative electrode having a large amount of hydroxide ions. Accordingly, it is possible to suppress the precipitation of a scale (CaCO3) in the vicinity of the negative electrode.

Further, when an anion exchange group is disposed between the bipolar membranes, it is possible to prevent calcium ions eliminated from a cation exchange group of the bipolar membrane at the time of regeneration from moving toward an anion exchange group of the facing bipolar membrane having a large amount of hydroxide ions. With such a configuration, the precipitation of a scale (CaCO3) in the anion exchange group can be suppressed.

The twelfth disclosure is directed to, particularly in the first disclosure, the water treatment device further including a spacer member disposed in a water flow path between the bipolar membranes, wherein a vertical length of the spacer member is larger than a length of the bipolar membrane.

With such a configuration, even when the vertical length of the bipolar membrane is prolonged due to swelling of the bipolar membrane by adsorption of calcium ions, the vertical length of the spacer member is larger than the length of the bipolar membrane and hence, the precipitation of a scale (CaCO3) in the bipolar membrane can be suppressed. Accordingly, the increase of a flow path resistance in the vertical direction between the bipolar membranes can be prevented and hence, lowering of an amount and a flow speed of water toward the vertical direction between the bipolar membranes can be prevented.

The thirteenth disclosure is directed to, particularly in the first or fourteenth disclosure, the water treatment device further including a spacer member disposed in a flow path of the water between the bipolar membranes, and a horizontal length of the spacer member is smaller than a length of the bipolar membrane.

With such a configuration, even when the horizontal length of the bipolar membrane is prolonged due to swelling of the bipolar membrane by adsorption of calcium ions, the horizontal length of the spacer member is smaller than the length of the bipolar membrane and hence, an end portion of the bipolar membrane in the horizontal direction is only compressed. As a result, the increase of a flow path resistance in the vertical direction between the bipolar membranes can be prevented thus preventing lowering of an amount and a flow speed of water toward the vertical direction between the bipolar membranes.

An exemplary embodiment of the present disclosure is described with reference to drawings hereinafter. However, the present disclosure is not limited by the exemplary embodiment.

First Exemplary Embodiment

Figure 1:
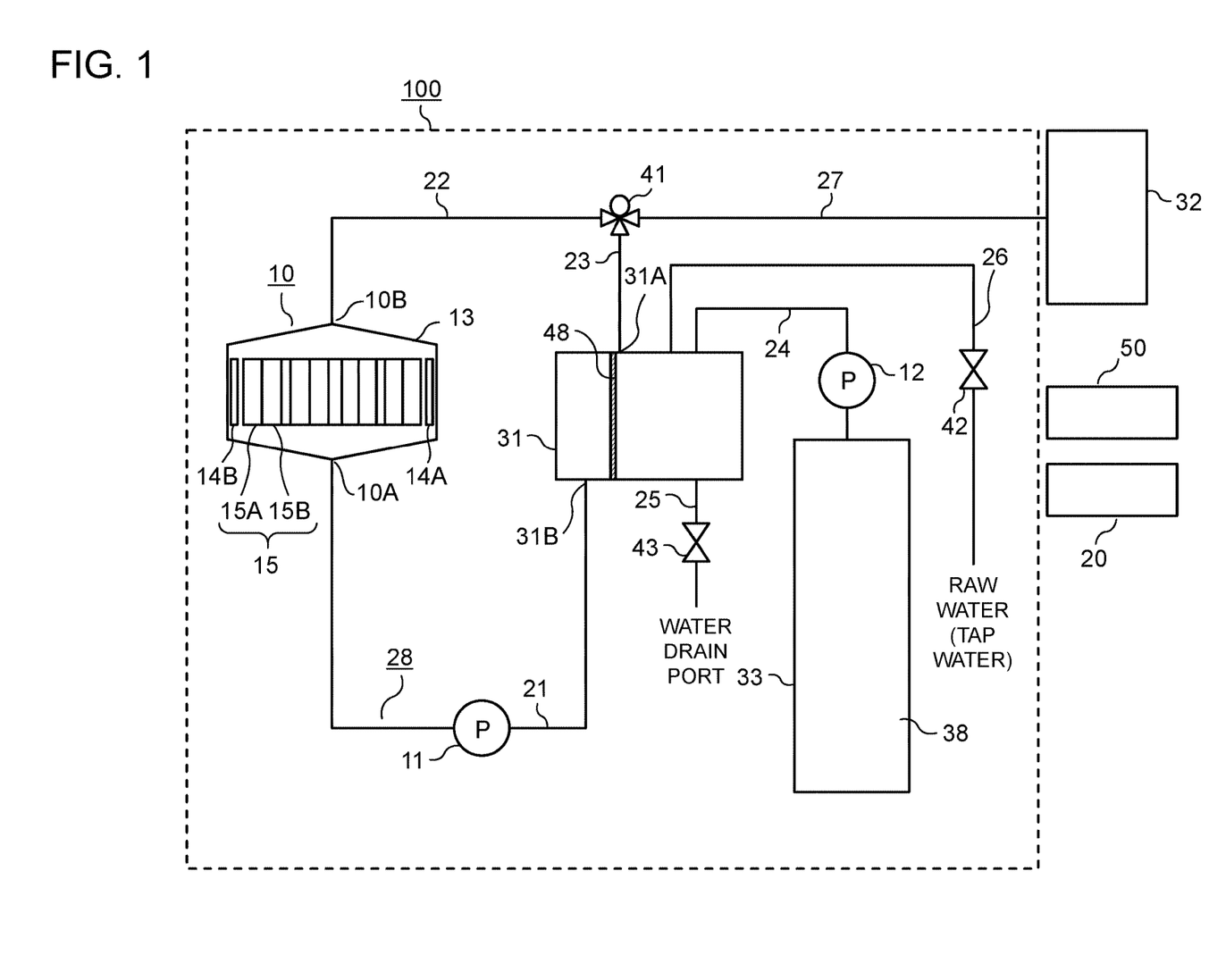
FIG. 1 is a constitutional diagram of a water treatment device according to a first exemplary embodiment of the present disclosure.

FIG. 1 is a constitutional diagram of water treatment device 100 according to a first exemplary embodiment of the present disclosure. First, a specific configuration of water treatment device 100 is described with reference to FIG. 1.

As shown in FIG. 1, water treatment device 100 according to the first exemplary embodiment includes: electrochemical cell 10 having bipolar membrane 15; first pump 11; first water flow path 21; second water flow path 22; third water flow path 23; tank 31; first flow path switching device 41; and control device 50.

Electrochemical cell 10 is configured such that electrode 14A, electrode 14B, and bipolar membrane 15 are disposed in the inside of casing 13. To be more specific, positive electrode 14A and negative electrode 14B are disposed so as to sandwich bipolar membrane 15 therebetween.

Bipolar membrane 15 is a stacked body which is configured such that a main surface of anion exchange group (anion exchange resin) 15A and a main surface of cation exchange group (cation exchange resin) 15B face each other.

Inlet port 10A is disposed on one end portion of casing 13, and an outlet port 10B is disposed on the other end portion of casing 13. As electrochemical cell 10, a known electrochemical cell can be used, and the description of the detailed configuration of the electrochemical cell 10 is omitted First water flow path 21 is connected to inlet port 10A of electrochemical cell 10 and outlet port 31B of tank 31. First pump 11 is disposed in a middle portion of first water flow path 21. Second water flow path 22 is connected to outlet port 10B of electrochemical cell 10 and first flow path switching device 41. Further, third water flow path 23 is connected to first flow path switching device 41 and inlet port 31A of tank 31.

Water treatment device 100 includes soft water discharge path 27 through which soft water stored in tank 31 is supplied to soft water storing portion 32 which stores water produced by water softening treatment (hereinafter referred to as soft water).

Soft water discharge path 27 is connected to first flow path switching device 41. First flow path switching device 41 is configured to switch a supply destination of water flowing through second water flow path 22 to soft water discharge path 27 or to third water flow path 23.

When first flow path switching device 41 switches the supply destination of water flowing through second water flow path 22 to soft water discharge path 27, and first pump 11 is operated in such a situation, soft water stored in tank 31 flows through electrochemical cell 10 and soft water discharge path 27 and, thereafter, reaches soft water storing portion 32 (in the first exemplary embodiment, soft water storing portion 32 is defined as "outside of the device"). Further, soft water stored in soft water storing portion 32 is supplied to a user of water treatment device 100. In the first exemplary embodiment, a three-way valve is used as first flow path switching device 41.

Further, water treatment device 100 includes raw water supply path 26 through which water (water such as tap water; hereinafter referred to as raw water) is supplied to tank 31, and first open/close valve 42 is disposed in a middle portion of raw water supply path 26.

That is, in water treatment device 100 according to the first exemplary embodiment, in performing water softening treatment by bipolar membrane 15, control device 50 supplies raw water to tank 31 through raw water supply path 26 by opening first open/close valve 42, and forms water circulation flow path 28 which is a closed flow path formed of tank 31, first water flow path 21, electrochemical cell 10, second water flow path 22, first flow path switching device 41, and third water flow path 23 by controlling first flow path switching device 41. Then, control device 50 is configured to operate first pump 11 disposed in first water flow path 21 thus allowing raw water to circulate in water circulation flow path 28, and produced soft water is stored in tank 31.

Thereafter, control device 50 controls first flow path switching device 41, and first flow path switching device 41 sets the supply destination of water flowing though second water flow path 22 to soft water discharge path 27. Then, control device 50 operates first pump 11 so that soft water stored in tank 31 flows through electrochemical cell 10 and soft water discharge path 27 and, thereafter, soft water reaches soft water storing portion 32. Then, soft water stored in soft water storing portion 32 is supplied to a user of water treatment device 100.

Water treatment device 100 also includes scale suppressing agent storing tank 33. Scale suppressing agent storing tank 33 is connected to tank 31 by way of scale suppressing agent supply path 24. In a middle portion of scale suppressing agent supply path 24, second pump 12 is disposed so that an aqueous solution in which scale suppressing agent 38 in scale suppressing agent storing tank 33 is dissolved is supplied to tank 31.

In scale suppressing agent storing tank 33, a concentration of scale suppressing agent 38 is adjusted such that the concentration of scale suppressing agent 38 is set to a first predetermined concentration (indicated by symbol P, for example, 500 ppm to 2000 ppm). As scale suppressing agent 38, polyphosphate or a citric acid may be used, for example. When the agent is put into tank 31 at the time of regeneration, the agent is diluted by a predetermined amount of raw water so that the concentration P is adjusted to 2 ppm to 50 ppm.

When the polyphosphate is used as scale suppressing agent 38, the configuration may be adopted where a container having water permeability and filled with polyphosphate is disposed in the inside of scale suppressing agent storing tank 33. The polymerization degree of polyphosphate may be set to 2 or more from a viewpoint of suppressing hydrolysis of polyphosphate and enhancing stability of scale suppressing agent 38.

When a citric acid is used as scale suppressing agent 38, even when scale precipitates in electrochemical cell 10 or the like, sticking of the scale can be suppressed by removing the scale.

An upstream end of water drain path 25 is connected to tank 31. A water drain port is formed on a downstream end of water drain path 25. A second open/close valve 43 is disposed in a middle portion of water drain path 25.

That is, water treatment device 100 according to the first exemplary embodiment is configured such that when regeneration treatment of bipolar membrane 15 is performed after soft water stored in tank 31 reaches soft water storing portion 32, control device 50 opens first open/close valve 42 so as to supply raw water to tank 31 through raw water supply path 26. Further, control device 50 operates second pump 12 so that aqueous solution in which scale suppressing agent 38 in scale suppressing agent storing tank 33 is dissolved is supplied to tank 31 through scale suppressing agent supply path 24. Further, control device 50 forms water circulation flow path 28 which is a closed flow path formed of tank 31, first water flow path 21, electrochemical cell 10, second water flow path 22, and third water flow path 23 by controlling first flow path switching device 41, and operates first pump 11 disposed in first water flow path 21 thus allowing raw water to circulate in water circulation flow path 28. Then, water used in the regeneration treatment is stored in tank 31.

Further, control device 50 opens second open/close valve 43 so that water used for regeneration treatment stored in tank 31 is drained from the water drain port through water drain path 25.

Filter 48 is disposed in the inside of tank 31. Inlet port 31A of tank 31 and water drain path 25 are connected to or formed on one side of tank 31 using filter 48 as a boundary, and outlet port 31B of tank 31 is connected to or formed on the other side of tank 31 using filter 48 as a boundary.

Power supply 20 may have any configuration provided that the power supply can supply power to electrochemical cell 10. For example, the power supply may be configured by converting an alternating voltage supplied from an alternating power supply such as a commercial power supply into a direct voltage using an alternating current/direct current (AC/DC) converter, or may be formed of a direct power supply such as a secondary battery.

Control device 50 is configured to control respective equipment such as power supply 20, the flow path switching device, the open/close valve, the pump and the like which form water treatment device 100. Control device 50 includes: a microprocessor; an arithmetic processing part exemplified as a central processing unit (CPU) or the like; a memory part which stores programs for executing respective control operations and is formed of a memory and the like; a time measurement part having an elapsed time measuring function (these components not shown in the drawing). In control device 50, an arithmetic processing part reads out a predetermined control program stored in the memory part and executes the program for performing various kinds of controls relating to water treatment device 100.

Control device 50 may be configured not only by a single controller but also by a group of controllers where the control of water treatment device 100 is executed by a plurality of controllers in a cooperative manner. Control device 50 may be formed of a microcontroller or may be formed of a micro-processing unit (MPU), a programmable logic controller (PLC), a logical circuit or the like.

Next, the specific operation of the water softening treatment by water treatment device 100 is described with reference to FIG. 1.

In starting the performing of water softening treatment, control device 50 opens first open/close valve 42. With such an operation, raw water is supplied to tank 31 from raw water supply path 26. Control device 50 closes first open/close valve 42 when a water level detector (not shown in the drawing) disposed in the inside of tank 31 detects a predetermined water level, and stops the supply of raw water to tank 31 through raw water supply path 26.

Next, control device 50 controls first flow path switching device 41 such that second water flow path 22 and third water flow path 23 are communicated with each other. With such an operation, water circulation flow path 28 is formed which is the closed flow path formed of tank 31, first water flow path 21, electrochemical cell 10, second water flow path 22, first flow path switching device 41, and third water flow path 23.

Then, control device 50 operates first pump 11 disposed in first water flow path 21 so that raw water circulates through water circulation flow path 28.

Next, control device 50 applies (supplies) power (at least either one of a voltage or a current) to electrode 14A and electrode 14B of electrochemical cell 10. In the first exemplary embodiment, power supply 20 is controlled such that a current having a fixed current value flows between electrode 14A and electrode 14B of electrochemical cell 10. Control device 50 applies a voltage to power supply 20 such that electrode 14A which faces cation exchange group 15B forms a positive electrode, and electrode 14B which faces anion exchange group 15A forms a negative electrode.

With such a configuration, hardness component (cations) such as calcium component in raw water supplied to electrochemical cell 10 is absorbed and removed by cation exchange group 15B existing in bipolar membrane 15 so that raw water is softened. Further, anions such as chloride ions in raw water are absorbed and removed by anion exchange group 15A. Then, soft water obtained by water softening treatment using electrochemical cell 10 is made to flow through second water flow path 22, and is stored in tank 31 from inlet port 31A.

With such an operation, raw water circulates through water circulation flow path 28 having electrochemical cell 10 and hence, an amount of raw water which passes through the electrochemical cell can be increased by adjusting a circulation flow rate of raw water. Accordingly, the adsorption and the removal of hardness components (cations) such as calcium components and anions such as chloride ions in raw water can be increased. As a result, it is possible to provide a water treatment device which can efficiently soften raw water.

Filter 48 of 400 meshes is disposed in the inside of tank 31. Inlet port 31A of tank 31 and water drain path 25 are connected to or formed on one side of tank 31 using filter 48 as a boundary, and outlet port 31B of tank 31 is connected to or formed on the other side of tank 31 using filter 48 as a boundary.

With such a configuration, it is possible to provide water treatment device which can collect, in tank 31, impurities contained in water flowing through water circulation flow path 28 which is a closed flow path formed of tank 31, first water flow path 21, electrochemical cell 10, second water flow path 22, first flow path switching device 41, and third water flow path 23 thus enhancing durability of electrochemical cell 10 and first pump 11. Further, it is possible to prevent mixing of impurities into produced soft water.

Particularly, (1) an end surface of filter 48 is mounted on a bottom surface of tank 31, filter 48 is placed on the bottom surface of tank 31 with a predetermined inclination angle (0 degrees to 90 degrees inclusive) with respect to the bottom surface of tank 31, (2) inlet port 31A formed on an upper surface of tank 31 and water drain path 25 connected to a lower surface of tank 31 are formed on one side of tank 31 using filter 48 as a boundary, and outlet port 31B formed on a lower surface of tank 31 is formed on the other side of tank 31 using filter 48 as the boundary, and (3) an incoming water flow from inlet port 31A of tank 31 into tank 31 impinges on an inclined surface of filter 48.

With such a configuration, impurities adhered to filter 48 can be accumulated on the bottom surface of tank 31 (on a water drain path 25 connection side) and hence, durability of filter 48 can be enhanced. The impurities accumulated on the bottom surface of tank 31 can be discharged from the water drain port from tank 31 through water drain path 25 in water draining processing for draining water in tank 31 after regeneration treatment described later through water drain path 25.

Next, control device 50 determines whether or not a voltage applied to power supply 20 is increased to a predetermined value, and when control device 50 determines that the voltage reaches the predetermined value, control device 50 stops the operation of first pump 11, and finishes the performing of the water softening treatment.

As softening of raw water in water circulation flow path 28 progresses, hardness components (cations) such as calcium components and anions such as chloride ions in raw water are removed from raw water and hence, a current minimally flows between electrode 14A and electrode 14B of electrochemical cell 10. A phenomenon is used where power supply 20 is controlled such that a current of a fixed current value flows between electrode 14A and electrode 14B and, as a result, a voltage applied to power supply 20 is increased.

As a method of determining finishing of the performing of water softening treatment, a method may be used where whether or not a predetermined time has elapsed is determined after applying a voltage, and an operation of first pump 11 is stopped when it is determined that a predetermined time has elapsed so that the performing of water softening treatment is finished. In the above-mentioned operation, the predetermined time is a time necessary for storing a predetermined volume of soft water in tank 31. The predetermined time may be calculated suitably based on a capacity of tank 31, an amount of soft water produced per unit time and the like, or may be obtained by an experiment in advance.

After control device 50 finishes the performing of water softening treatment, control device 50 controls first flow path switching device 41 such that second water flow path 22 communicates with soft water discharge path 27. Then, control device 50 operates first pump 11 so that soft water stored in tank 31 flows through first water flow path 21, electrochemical cell 10, second water flow path 22, first flow path switching device 41, and soft water discharge path 27 and, thereafter, is stored in soft water storing portion 32. When control device 50 determines that soft water stored in tank 31 is eliminated, control device 50 stops an operation of first pump 11.

With such an operation, it is possible to form the flow path through which soft water stored in tank 31 can be supplied to soft water storing portion 32 disposed outside water treatment device 100 through soft water discharge path 27 by merely switching first flow path switching device 41. Accordingly, it is possible to provide water treatment device 100 which can supply soft water to a user at a low cost without forming a cumbersome flow path.

By repeating the performing of the above-mentioned water softening treatment and the above-mentioned supply of soft water in tank 31 to soft water storing portion 32, soft water stored in soft water storing portion 32 is supplied to a user of water treatment device 100.

Next, a specific operation of regeneration treatment of bipolar membrane 15 by water treatment device 100 is described with reference to FIG. 1.

In a state where supply of soft water in tank 31 to soft water storing portion 32 is finished so soft water does not exist in tank 31, the performing of regeneration treatment of bipolar membrane 15 is started. First, control device 50 opens first open/close valve 42. With such an operation, raw water is supplied to tank 31 from raw water supply path 26. Control device 50 also operates second pump 12 so that aqueous solution in which scale suppressing agent 38 in scale suppressing agent storing tank 33 is dissolved is supplied to tank 31 through scale suppressing agent supply path 24.

Control device 50 closes first open/close valve 42 when a water level detector disposed in the inside of tank 31 (not shown in the drawing) detects a predetermined water level, and stops the supply of raw water to tank 31 through raw water supply path 26. Control device 50 also stops an operation of second pump 12 thus stopping of the supply of aqueous solution in which scale suppressing agent 38 in scale suppressing agent storing tank 33 is dissolved to tank 31 through scale suppressing agent supply path 24.

Next, control device 50 controls first flow path switching device 41 such that second water flow path 22 and third water flow path 23 are communicated with each other. With such a configuration, water circulation flow path 28 is formed which is the closed flow path formed of tank 31, first water flow path 21, electrochemical cell 10, second water flow path 22, first flow path switching device 41, and third water flow path 23. Then, control device 50 operates first pump 11 disposed in first water flow path 21 so that raw water containing scale suppressing agent 38 circulates water circulation flow path 28.

Next, control device 50 applies (supplies) power (at least either one of a voltage or a current) to electrode 14A and electrode 14B of electrochemical cell 10. In the first exemplary embodiment, power supply 20 is controlled such that a current having a fixed current value flows between electrode 14A and electrode 14B of electrochemical cell 10.

Control device 50 intermittently supplies a voltage to power supply 20 such that electrode 14A becomes the negative electrode and electrode 14B becomes the positive electrode opposite to the case of water softening treatment. To be more specific, by repeating four-minute energization and thirty-second non-energization, a temperature increase of electrode 14A and electrode 14B is suppressed.

With such an operation, a potential difference is generated on a boundary surface formed by cation exchange group 15B and anion exchange group 15A of bipolar membrane 15, and water is dissociated so that hydrogen ions are generated on a cation exchange group 15B side, and hydroxide ions are generated on an anion exchange group 15A side.

Hardness components (cations) such as calcium ions or magnesium ions adsorbed by cation exchange group 15B are eliminated by ion exchange with generated hydrogen ions so that cation exchange group 15B is regenerated. On the other hand, anions such as chloride ions adsorbed by anion exchange group 15A are eliminated by ion exchange with generated hydrogen ions so that anion exchange group 15A is regenerated. Then, treated water is stored in tank 31 from inlet port 31A.

Calcium ions adsorbed by cation exchange group 15B are discharged and hence, when concentration of calcium ions is increased to a predetermined value or more, scale is precipitated. However, with the use of polyphosphate as scale suppressing agent 38, it is possible to suppress precipitation of scale (CaCO3) in the members which form water circulation flow path 28 such as electrochemical cell 10, first pump 11, first water flow path 21, second water flow path 22, third water flow path 23, tank 31, and first flow path switching device 41.

With such a configuration, raw water circulates in water circulation flow path 28 having electrochemical cell 10 so that hardness components (cations) such as calcium components and anions such as chloride ions can be eliminated from electrochemical cell 10 by a small amount of regeneration-use water and hence, it is possible to provide water treatment device 100 which can regenerate electrochemical cell 10 efficiently and can suppress the generation of a scale.

Next, control device 50 determines whether or not a voltage applied to power supply 20 is decreased to a predetermined value. When control device 50 determines that the voltage reaches the predetermined value, control device 50 stops an operation of first pump 11, and finishes the performing of the regeneration treatment. In this exemplary embodiment, raw water is used as the regeneration-use water. However, the regeneration treatment may be performed by using soft water which is produced by softening treatment performed by electrochemical cell 10. With such an operation, the increase of concentration of calcium ions in water obtained by regeneration treatment can be suppressed thus reducing the precipitation of a scale.

Next, control device 50 determines whether or not a voltage applied to power supply 20 is increased to a predetermined value. When control device 50 determines that the voltage reaches the predetermined value, control device 50 stops an operation of first pump 11, and finishes the performing of the regeneration treatment.

As the regeneration of bipolar membrane 15 progresses, hardness components (cations) such as calcium components and anions such as chloride ions are discharged to treated water and hence, a resistance of bipolar membrane 15 is increased so that a current minimally flows between electrode 14A and electrode 14B of electrochemical cell 10. A phenomenon is used where power supply 20 is controlled such that a current of a fixed current value flows between electrode 14A and electrode 14B and, as a result, a voltage applied to power supply 20 is increased.

As a method of determining finishing of the performing of regeneration treatment, a method may be used where whether or not a predetermined time has elapsed is determined after applying a voltage, and an operation of first pump 11 is stopped thus finishing the performing of the regeneration treatment when it is determined that a predetermined time has elapsed. In this exemplary embodiment, the predetermined time is a time necessary for regeneration of bipolar membrane 15. The predetermined time may be obtained by an experiment in advance.

After control device 50 finishes the performing of the regeneration treatment, control device 50 opens second open/close valve 43 so that water used for the regeneration treatment and stored in tank 31 is drained through water drain path 25.

Particularly, (1) an end surface of filter 48 is mounted on a bottom surface of tank 31, filter 48 is placed on the bottom surface of tank 31 with a predetermined inclination angle (0 degrees to 90 degrees inclusive) with respect to the bottom surface of tank 31, (2) inlet port 31A formed on an upper surface of tank 31 and water drain path 25 connected to a lower surface of tank 31 are formed on one side of tank 31 using filter 48 as a boundary, outlet port 31B formed on a lower surface of tank 31 is formed on the other side of tank 31 using filter 48 as a boundary, and (3) incoming water flowing into tank 31 through inlet port 31A of tank 31 impinges on an inclined surface of filter 48.

With such a configuration, impurities adhered to filter 48 can be accumulated on the bottom surface of tank 31 (on a water drain path 25 connection side) and hence, durability of filter 48 can be enhanced. The impurities accumulated on the bottom surface of tank 31 can be discharged from the water drain port from the inside of tank 31 through water drain path 25 in water draining processing for draining water in tank 31 after regeneration treatment through water drain path 25.

In this exemplary embodiment, tank 31 is used as a tank for storing treated water at the time of performing water softening treatment and as a tank for storing treated water at the time of performing regeneration treatment in common. However, a tank may be provided individually for respective treatments. With such treatment, it is possible to suppress mixing of high-concentration water and impurities generated at the time of performing the regeneration treatment into treated soft water thus providing higher-quality soft water.

Next, a configuration of another water treatment device 100 is described with reference to FIG. 2.

Figure 2:
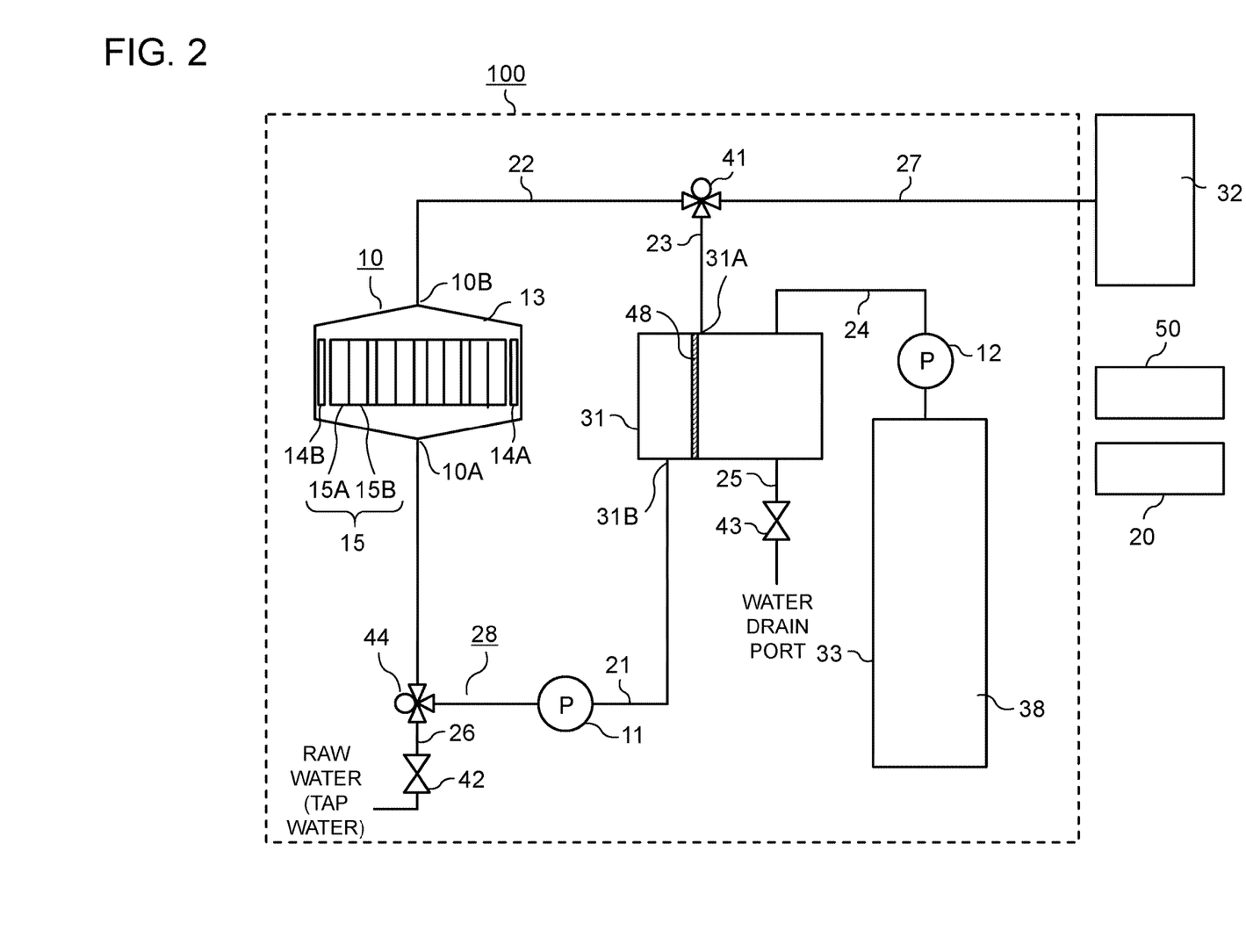
FIG. 2 is a constitutional diagram of a water treatment device according to another exemplary embodiment of the present disclosure.

A point which makes the configuration shown in FIG. 2 different from the configuration shown in FIG. 1 lies in that second flow path switching device 44 is disposed in a middle portion of first water flow path 21, and raw water supply path 26 is connected to second flow path switching device 44. In the first exemplary embodiment, in the same manner as first flow path switching device 41, a three-way valve is used as second flow path switching device 44. However, first flow path switching device 41 and second flow path switching device 44 share the same concept with respect to the supply of raw water to water circulation flow path 28.

Accordingly, with respect to the specific operation, a point which makes the configuration shown in FIG. 2 different from the configuration shown in FIG. 1 lies in that in starting the performing of water softening treatment and regeneration treatment, control device 50 opens first open/close valve 42, and controls second flow path switching device 44 such that electrochemical cell 10 and raw water supply path 26 are communicated with each other thus supplying raw water from an electrochemical cell 10 side.

Figure 3:
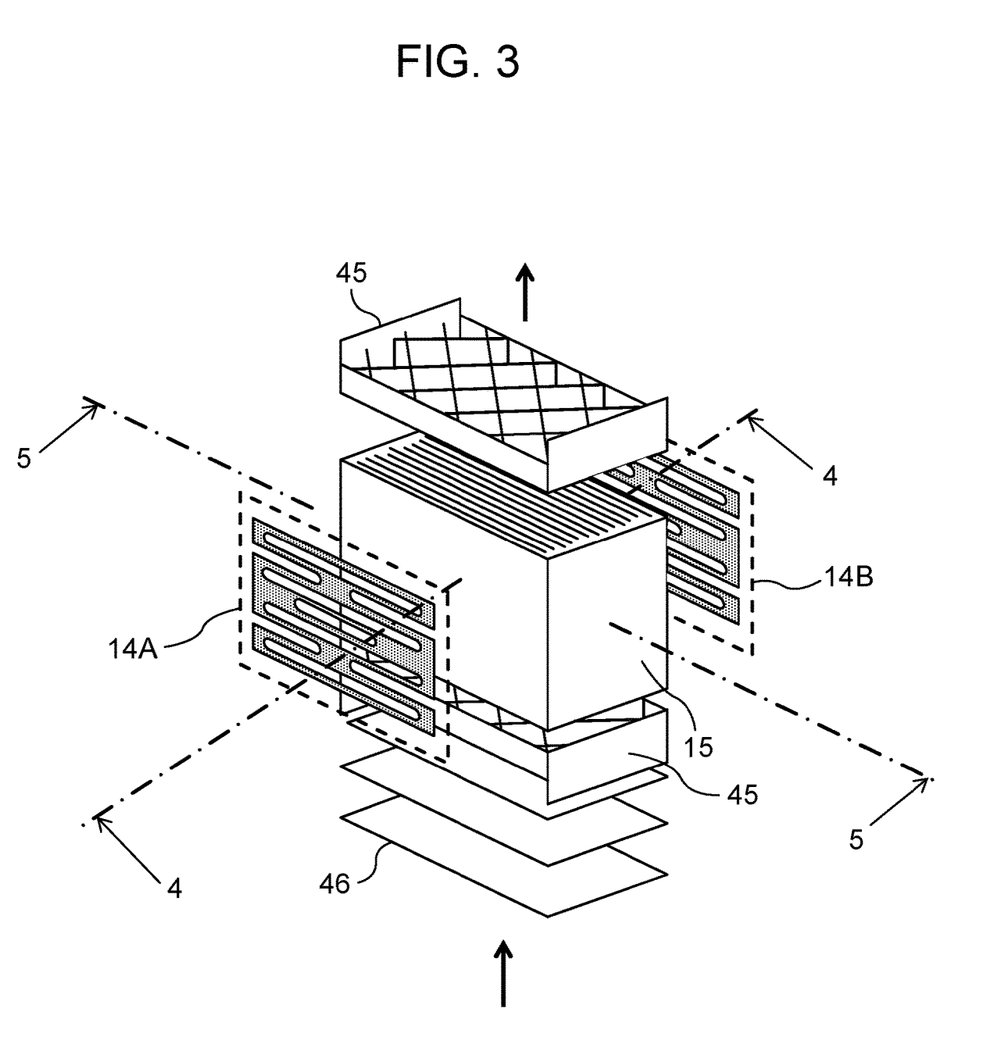
FIG. 3 is a perspective view of an electrochemical cell in the first exemplary embodiment of the present disclosure.

FIG. 3 is a perspective view of electrochemical cell 10 in the first exemplary embodiment of the present disclosure. Next, the specific configuration of electrochemical cell 10 is described with reference to FIG. 3.

Electrochemical cell 10 includes electrode 14A, electrode 14B, and bipolar membrane 15. To be more specific, electrode 14A and electrode 14B are disposed so as to sandwich bipolar membrane 15 therebetween. Bipolar membrane 15 is a stacked body which is configured such that a main surface of anion exchange group (anion exchange resin) 15A and a main surface of cation exchange group (cation exchange resin) 15B face each other.

Further, electrochemical cell 10 is configured to have a flow path where when water softening treatment of raw water and regeneration treatment of bipolar membrane 15 are performed, raw water flows vertically in an upward direction (the flow indicated by an arrow) and passes through between stacked bodies of bipolar membrane 15.

First flow straightening members 45 are disposed in the flow path upstream of and downstream of bipolar membrane 15 respectively so as to sandwich bipolar membrane 15 by first flow straightening members 45. Each of first flow straightening members 45 is made of an insulating material and has a plurality of flow path apertures formed by a latticed member.

A plurality of porous second flow straightening members 46 which are sintered bodies made of polypropylene (PP) are disposed in the flow path upstream of the first flow straightening member.

Electrode 14A and electrode 14B are formed in a planar shape, and are shaped such that a plurality of notched portions and opening portions formed of through holes are formed at center portions of the respective electrodes. Electrode 14A and electrode 14B are disposed at positions where electrode 14A and electrode 14B face bipolar membrane 15 in a direction perpendicular to the flow path and electrode 14A and electrode 14B fall within a projection area of bipolar membrane 15 in the direction perpendicular to the flow path.

That is, the plurality of porous second flow straightening members 46 which are sintered bodies made of polypropylene (PP) are disposed in the flow path upstream of the first flow straightening member. With such a configuration, the flow of raw water is straightened when water softening treatment of raw water and regeneration treatment of bipolar membrane 15 are performed. Accordingly, the raw water flows through between the stacked bodies of bipolar membrane 15 while being made uniform and hence, it is possible to provide water treatment device 100 which can efficiently soften raw water and can regenerate bipolar membrane 15.

Since electrode 14A and electrode 14B are formed in a planar shape, and are shaped such that a plurality of notched portions and through holes are formed at center portions of the respective electrodes, current concentration at an end portion side can be alleviated so that consumption of electrode at an end portion and precipitation of a scale can be suppressed.

First flow straightening members 45 are disposed in the flow path upstream of and downstream of bipolar membrane 15 respectively so as to sandwich bipolar membrane 15 by first flow straightening members 45. Each of first flow straightening members 45 is made of an insulating material and has a plurality of flow path apertures formed by a latticed member. With such a configuration, particularly, it is possible to prevent clogging of bipolar membrane 15 caused by precipitates of hard components such as calcium components formed at the time of regenerating bipolar membrane 15, and the precipitates can be collected by filter 48 disposed in the inside of tank 31. Accordingly, it is possible to provide water treatment device 100 which can regenerate bipolar membrane 15 in a stable manner.

Further, electrode 14A and electrode 14B are disposed at positions where electrode 14A and electrode 14B face bipolar membrane 15 in the direction perpendicular to the flow path and electrode 14A and electrode 14B fall within a projection area of bipolar membrane 15 in the direction perpendicular to the flow path. Accordingly, also in water softening treatment and regeneration treatment, ions which flow through between electrode 14A and electrode 14B can be made to flow through bipolar membrane 15 with certainty and hence, it is possible to provide the water treatment device which can efficiently soften raw water and can regenerate the bipolar membrane.

Here, first flow straightening members 45 disposed in the flow path upstream of and downstream of bipolar membrane 15 are made of insulating material such as PP having no ion conductivity respectively and hence, the advantageous effects obtained by such a configuration can be further enhanced.

Figure 4A:
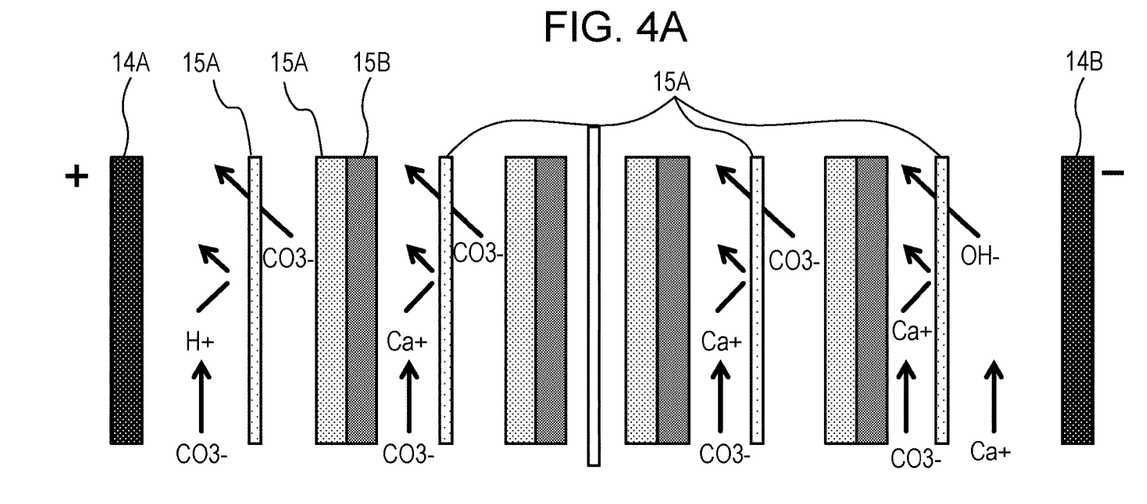
FIG. 4A is a view showing a state of ions at the time of performing the regeneration treatment in cross section taken along line 4-4 in FIG. 3.
Figure 4B:
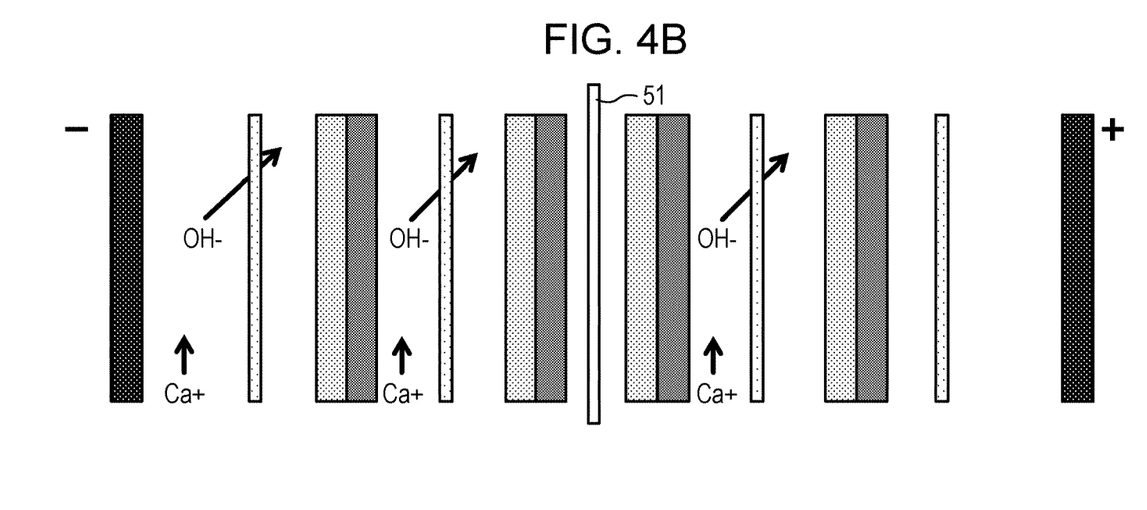
FIG. 4B is a view showing a state of ions at the time of producing soft water in cross section taken along line 4-4 in FIG. 3.

FIG. 4A is a view showing a state of ions at the time of performing the regeneration treatment in cross section taken along line 4-4 in FIG. 3. FIG. 4B is a view showing a state of ions at the time of producing soft water in cross section taken along line 4-4 in FIG. 3.

Next, a state of ions at the time of performing the regeneration treatment of electrochemical cell 10 and a state of ions at the time of producing soft water are described with reference to FIG. 4A and FIG. 4B.

Anion exchange group 15A is disposed between electrode 14A and anion exchange group (anion exchange resin) 15A of bipolar membrane 15, or between electrode 14B and cation exchange group (cation exchange resin) 15B of bipolar membrane 15.

When anion exchange group 15A is disposed between electrode 14B which is a negative electrode during regeneration treatment and cation exchange group (cation exchange resin) 15B of bipolar membrane 15, it is possible to prevent calcium ions which are eliminated from cation exchange group 15B from moving toward negative electrode 14B having a large amount of hydroxide ions. Accordingly, it is possible to suppress the precipitation of a scale (CaCO3) in the vicinity of negative electrode 14B.

Further, when anion exchange group 15A is disposed between negative electrode 14A during production of soft water and anion exchange group (anion exchange resin) 15A of bipolar membrane 15, it is possible to prevent calcium ions which exceeds an adsorption ability of the bipolar membrane and are eliminated from cation exchange group 15B of bipolar membrane 15 from moving toward negative electrode 14A having a large amount of hydroxide ions. Accordingly, it is possible to suppress the precipitation of a scale (CaCO3) in the vicinity of negative electrode 14A.

Anion exchange group 15A may be disposed both between electrode 14A and anion exchange group (anion exchange resin) 15A of bipolar membrane 15 and between electrode 14B and cation exchange group (cation exchange resin) 15B of bipolar membrane 15.

Further, when anion exchange group 15A is disposed between the stacked bodies of bipolar membranes 15 which form a water flow path, it is possible to prevent calcium ions eliminated from cation exchange group 15B of bipolar membrane 15 from moving toward anion exchange group 15A of facing bipolar membrane 15 having a large amount of hydroxide ions at the time of regeneration. With such a configuration, the precipitation of a scale (CaCO3) in anion exchange group 15A can be suppressed.

Figure 5:
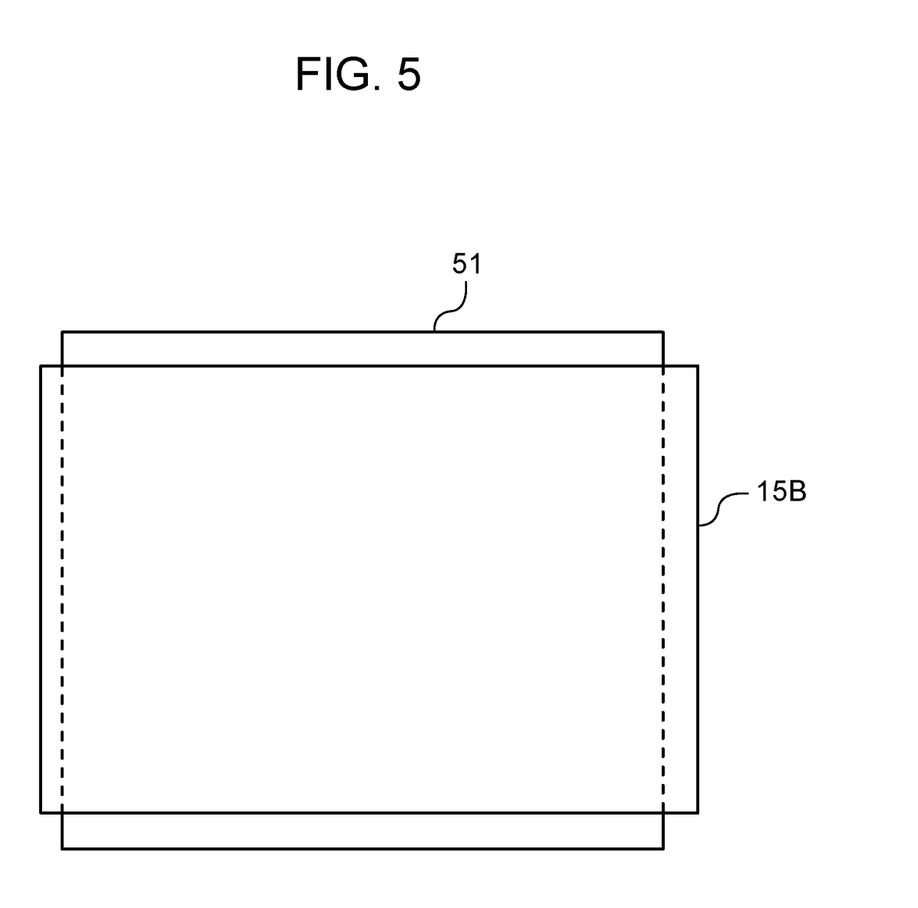
FIG. 5 is a cross-sectional view taken along line 5-5 in FIG. 3.

Next, spacer member 51 is described with reference to FIG. 4A, FIG. 4B, and FIG. 5.

Spacer member 51 is disposed between the stacked bodies of bipolar membrane 15 which form the water flow path, and a vertical length of spacer member 51 is set larger than a length of bipolar membrane 15.

With such a configuration, even when the vertical length of bipolar membrane 15 is prolonged due to swelling of bipolar membrane 15 by adsorption of calcium ions, the vertical length of spacer member 51 is larger than the length of bipolar membrane 15 and hence, the precipitation of a scale (CaCO3) in bipolar membrane 15 can be suppressed. As a result, the increase of a flow path resistance in the vertical direction between bipolar membranes 15 can be prevented thus preventing lowering of an amount and a flow speed of water toward the vertical direction between bipolar membranes 15.

Further, a horizontal length of spacer member 51 is set smaller than a length of bipolar membrane 15.

With such a configuration, even when the horizontal length of bipolar membrane 15 is prolonged due to swelling of bipolar membrane 15 by adsorption of calcium ions, the horizontal length of spacer member 51 is smaller than the length of bipolar membrane 15 and hence, an end portion of bipolar membrane 15 in the horizontal direction is only compressed. As a result, the increase of a flow path resistance in the vertical direction between bipolar membranes 15 can be prevented thus preventing lowering of an amount and a flow speed of water toward the vertical direction between bipolar membranes 15.

Figure 6:
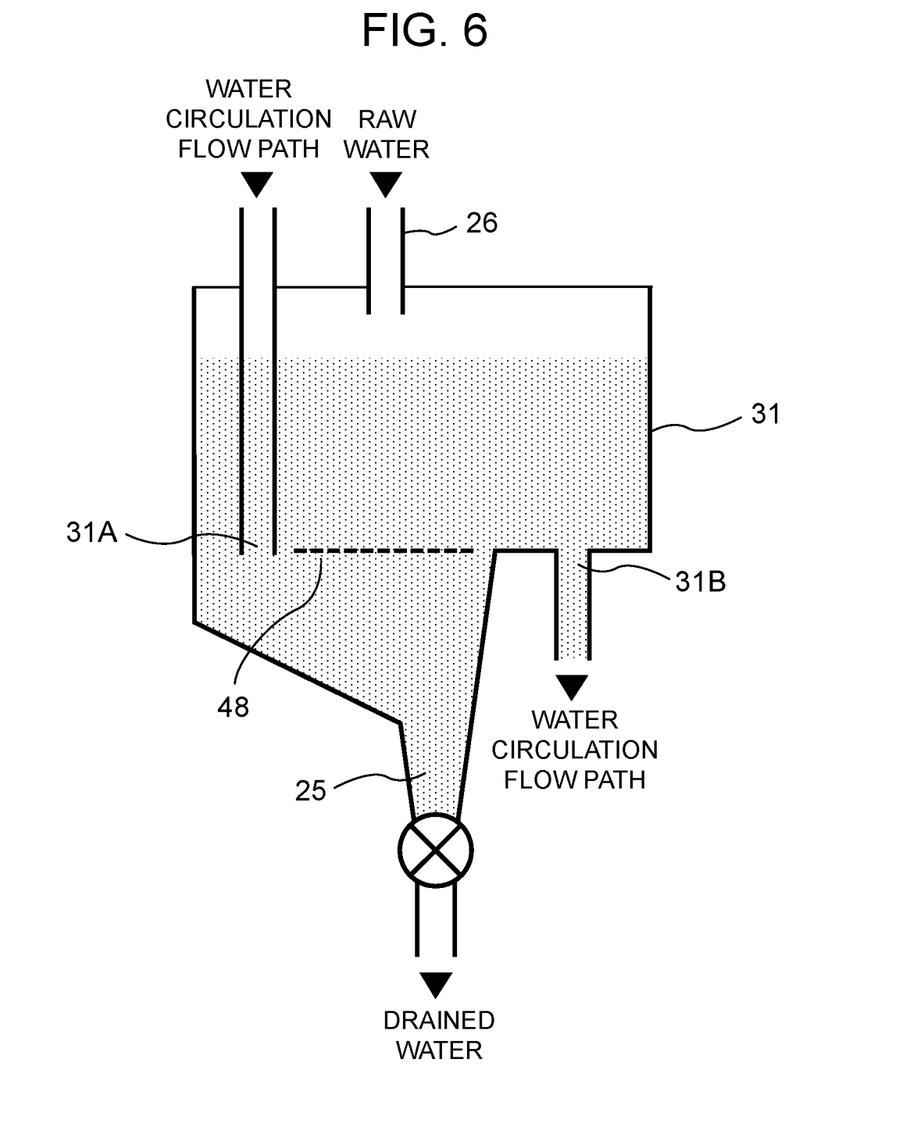
FIG. 6 is a constitutional diagram of another tank in the first exemplary embodiment of the present disclosure.

Next, the configuration of another tank according to the first exemplary embodiment of the present disclosure is described with reference to FIG. 6.

Another tank includes: water drain path 25 for draining water in tank 31; filter 48 disposed in the inside of tank 31; inlet port 31A of water circulation flow path 28 to tank 31; and outlet port 31B of water circulation flow path 28 from tank 31. Raw water supply path 26 and water drain path 25 are connected to tank 31 on an upper side and a lower side with filter 48 used as a boundary in a vertical direction respectively. Water which circulates through water circulation flow path 28 flows into tank 31 from inlet port 31A once, then, passes through filter 48 from an arrangement direction of water drain path 25 toward an arrangement direction of raw water supply path 26 (from a lower side toward an upper side in the vertical direction) and, thereafter, flows out to the outside of tank 31 from outlet port 31B.

A scale (CaCO3) is collected by a surface of filter 48 on a side where water drain path 25 is disposed (a lower side in the vertical direction). In the configuration of another tank, when raw water is supplied through raw water supply path 26 or when a level of water in tank 31 is lowered at the time of draining water, a scale (CaCO3) moves toward a water drain path 25 side which is disposed vertically downstream of filter 48 used as a boundary due to the flow of water directed toward a downstream side in the vertical direction. Accordingly, precipitates such as calcium components can be smoothly discharged from water drain path 25.

INDUSTRIAL APPLICABILITY

As has been described heretofore, the water treatment device according to the present disclosure has a function of efficiently softening water and hence, the water treatment device is useful in the field of water treatment.

REFERENCE MARKS IN THE DRAWINGS 10 electrochemical cell
10A inlet port
10B outlet port
11 first pump (circulation device)
12 second pump
13 casing
14A electrode
14B electrode
15 bipolar membrane
15A anion exchange group
15B cation exchange group
20 power supply
21 first water flow path
22 second water flow path
23 third water flow path
24 scale suppressing agent supply path
25 water drain path
26 raw water supply path
27 soft water discharge path
28 water circulation flow path
31 tank
31A inlet port
31B outlet port
32 soft water storing portion
33 scale suppressing agent storing tank
38 scale suppressing agent
44 first flow path switching device
42 first open/close valve
43 second open/close valve
44 second flow path switching device
45 first flow straightening member
46 second flow straightening member
50 control device
100 water treatment device

The invention claimed is:
1. A water treatment device comprising:
an electrochemical cell having electrodes including a positive electrode and a negative electrode, and a bipolar membrane disposed between the positive electrode and the negative electrode;
a tank;

a power supply configured to apply power to the electrodes;

a water circulation flow path comprising the tank, an inlet port to the tank, an outlet port from the tank, and the electrochemical cell, and through which water circulates;

a circulator configured to circulate the water in the water circulation flow path;

a raw water supply path configured to supply raw water to the water circulation flow path;

a controller; and a filter disposed in inside of the tank, wherein, in performing water softening treatment in the electrochemical cell, power is applied to the electrodes so as to remove ions from the raw water and soft water is produced, the controller drives the circulator so as to circulate the water in the water circulation flow path, and the inlet port of the water circulation flow path to the tank is disposed on one side of the tank using the filter as a boundary, and the outlet port of the water circulation flow path to the tank is disposed on another side of the tank using the filter as the boundary.

2. The water treatment device according to claim 1, further comprising:

a flow path switch disposed in a middle portion of the water circulation flow path; and a soft water discharge path which is connected to the flow path switch and through which the soft water is discharged from inside of the flow path switch, wherein the flow path switch is configured to select either an operation of making the tank and the soft water discharge path communicate with each other or an operation of forming the water circulation flow path into a closed flow path, and the flow path switch is also configured to discharge the soft water stored in the tank through the soft water discharge path when the tank and the soft water discharge path are made to communicate with each other.

3. The water treatment device according to claim 1, further comprising:

a water drain path through which the water in the tank is drained; and a scale suppressing agent supply path through which a scale suppressing agent is supplied into the tank, wherein, in the electrochemical cell, in performing regeneration treatment of the bipolar membrane in which power is applied to the electrodes such that the electrodes have potentials reverse to potentials used in the water softening treatment, the controller allows the supply of the raw water and the scale suppressing agent into the tank and, at the same time, drives the circulator so as to circulate the water in the water circulation flow path and drains the water used for the regeneration treatment stored in the tank through the water drain path.

4. The water treatment device according to claim 1, wherein the controller determines finishing of treatment based on a lapsed time from starting of the treatment or values of voltages applied to the electrodes in at least one of water softening treatment and regeneration treatment.

5. The water treatment device according to claim 1, wherein the positive electrode and the negative electrode are disposed such that the positive electrode and the negative electrode face the bipolar membrane so as to sandwich the bipolar membrane between the positive electrode and the negative electrode, and the positive electrode and the negative electrode are disposed at positions where the positive electrode and the negative electrode fall within a projection area of the bipolar membrane.

6. The water treatment device according to claim 1, wherein the positive electrode and the negative electrode are formed in a planar shape with a center portion, and first and second through holes are respectively disposed at the center portions of the positive and negative electrodes.

7. The water treatment device according to claim 3, wherein flow straightening members are disposed in the water circulation flow path upstream of and downstream of the bipolar membrane respectively so as to sandwich the bipolar membrane by the flow straightening members, each of the flow straightening members being made of an insulating material and having a plurality of flow path apertures formed by a latticed member.

8. The water treatment device according to claim 3, wherein power to be applied to the electrodes is intermittently supplied when regeneration treatment of the bipolar membrane is performed.

9. The water treatment device according to claim 1, further comprising:

a water drain path configured to drain water in the tank, wherein the raw water supply path and the water drain path are vertically disposed upstream of and downstream of the tank, respectively, with the filter therebetween, and the water which circulates in the water circulation flow path flows into the tank from the inlet port, passes the filter from a side of the filter facing the water drain path toward a side of the filter facing the raw water supply path and, thereafter, flows out from the outlet port to outside of the tank.

10. The water treatment device according to claim 1, wherein an anion exchange group is disposed between one of the electrodes and the bipolar membrane and in a flow path of the water between said one of the electrodes and the bipolar membrane.

11. The water treatment device according to claim 1, wherein a plurality of bipolar membranes are present, the water treatment device further comprising a spacer member disposed in a water flow path between the bipolar membranes, wherein a vertical length of the spacer member is larger than a length of the bipolar membranes.

12. The water treatment device according to claim 1, wherein a plurality of bipolar membranes are present, the water treatment device further comprising a spacer member disposed in a flow path of the water between the bipolar membranes, wherein a horizontal length of the spacer member is smaller than a length of the bipolar membranes.

* * * * *